US012561528B2

(12) United States Patent
Musundi et al.

(10) Patent No.: US 12,561,528 B2
(45) Date of Patent: Feb. 24, 2026

(54) ALT TEXT VALIDATION SYSTEM

(71) Applicant: Microsoft Technology Licensing, LLC, Redmond, WA (US)

(72) Inventors: Meshack Kokonya Musundi, Nairobi (KE); Jia Ma, New York, NY (US); Victor Onyango Oriko, Nairobi (KE)

(73) Assignee: Microsoft Technology Licensing, LLC, Redmond, WA (US)

( * ) Notice: Subject to any disclaimer, the term of this patent is extended or adjusted under 35 U.S.C. 154(b) by 294 days.

(21) Appl. No.: 18/468,379

(22) Filed: Sep. 15, 2023

(65) Prior Publication Data

US 2025/0094720 A1 Mar. 20, 2025

(51) Int. Cl.
*G06F 40/30* (2020.01)
*G06F 16/951* (2019.01)
*G06F 40/194* (2020.01)
*G06F 40/40* (2020.01)

(52) U.S. Cl.
CPC ............ *G06F 40/30* (2020.01); *G06F 16/951* (2019.01); *G06F 40/194* (2020.01); *G06F 40/40* (2020.01)

(58) Field of Classification Search
USPC ........................................................ 382/181
See application file for complete search history.

(56) References Cited

U.S. PATENT DOCUMENTS

2014/0033003 A1* 1/2014 Johnson ................ G06F 40/143
715/201

2020/0012712 A1 1/2020 Johnson
2021/0064879 A1 3/2021 Gupta et al.
2021/0073617 A1 3/2021 Bazzani et al.

FOREIGN PATENT DOCUMENTS

CA 3119236 A1 11/2022
CN 109885796 A 6/2019

OTHER PUBLICATIONS

Elfving, Ralf, "Use AI to generate Shopify product image alt text", Retrieved from: https://medium.com/@ralfelfving/use-ai-to-generate-shopify-product-image-alt-text-b4d5c88edee4, May 9, 2023, 24 Pages.

* cited by examiner

*Primary Examiner* — Jacky X Zheng
(74) *Attorney, Agent, or Firm* — NovoTechIP International PLLC

(57) ABSTRACT

Validation of alt text for images in web pages includes extracting image data from the web pages, the image data including source data and alt text data for a plurality of image elements in the web pages. Natural language descriptions of the image elements are generated by providing images defined by the source data to a computer vision component. Prompts are then generated for a semantic comparison model. The prompts include the natural language descriptions of image elements and the alt text for the image elements. The semantic comparison model is trained to output similarity scores for the prompts. Each of the similarity scores is indicative of a similarity between the natural language description and the alt text data for the image element associated with each prompt. Image elements having inaccurate alt text can then be determined based the similarity score.

20 Claims, 6 Drawing Sheets

400

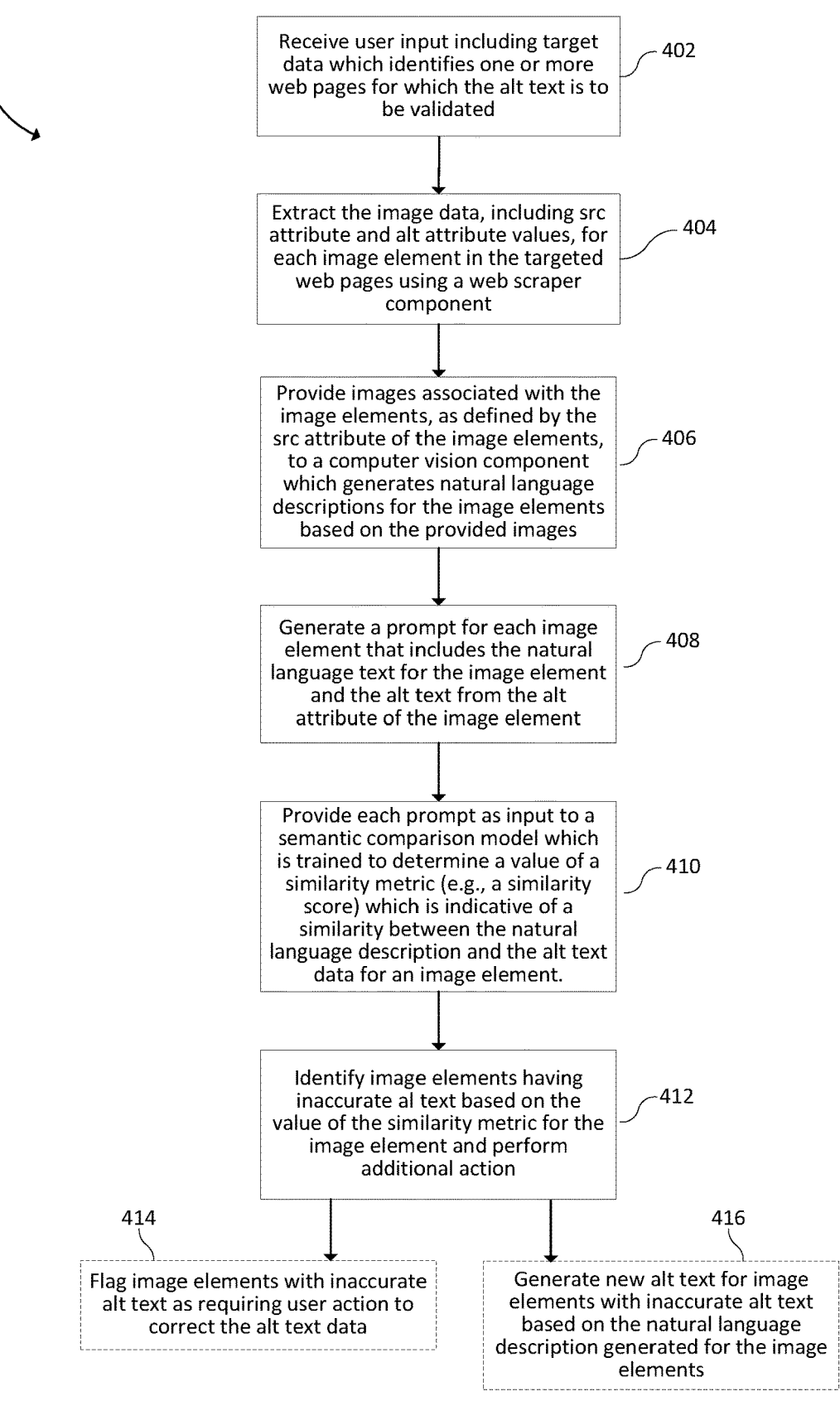

Receive user input including target data which identifies one or more web pages for which the alt text is to be validated — 402

Extract the image data, including src attribute and alt attribute values, for each image element in the targeted web pages using a web scraper component — 404

Provide images associated with the image elements, as defined by the src attribute of the image elements, to a computer vision component which generates natural language descriptions for the image elements based on the provided images — 406

Generate a prompt for each image element that includes the natural language text for the image element and the alt text from the alt attribute of the image element — 408

Provide each prompt as input to a semantic comparison model which is trained to determine a value of a similarity metric (e.g., a similarity score) which is indicative of a similarity between the natural language description and the alt text data for an image element. — 410

Identify image elements having inaccurate al text based on the value of the similarity metric for the image element and perform additional action — 412

414

416

Flag image elements with inaccurate alt text as requiring user action to correct the alt text data Generate new alt text for image elements with inaccurate alt text based on the natural language description generated for the image elements

ALT TEXT VALIDATION SYSTEM

BACKGROUND

Alt text, short for "alternative text," is a textual description inserted into the hypertext markup language (HTML) code of a web page for an image that is to be displayed in the web page. Alt text has an important role in making web content more accessible, enhancing user experience, and improving search engine optimization (SEO). Alt text is typically added via the alt attribute (e.g., <img src="example.jpg" alt="Alt text goes here">). The alt attribute is the HTML attribute used to specify alternative text that is to be displayed in place of an element that cannot be rendered.

However, the alt attribute for images is frequently left empty or includes text which insufficiently and/or inaccurately describes the image. Various automated tools have been developed which can identify images that do not have alt text, retrieve alt text, and/or facilitate the editing of alt text. Current tools for auditing alt text are generally not capable of validating the accuracy of alt text or suggesting improved alt text. Alt text evaluation and validation must still be performed manually by a user, which can be time-consuming and prone to subjectivity and inconsistency.

Hence, what is needed are systems and methods for quickly and consistently evaluating and validating the accuracy of image alt text and generating improved alt text if needed.

SUMMARY

In one general aspect, the instant disclosure presents an alt text validation system having a processor and a memory in communication with the processor wherein the memory stores executable instructions that, when executed by the processor alone or in combination with other processors, cause the alt text validation system to perform multiple functions. The function may include extracting image data from at least one web page, the image data including source data and alt text data for a plurality of image elements in the at least one web page; providing images defined by the source data as input to a computer vision component; receiving a natural language description of each of the images from the computer vision component; generating prompts for the image elements, each of the prompts being associated with an image and including at least the natural language description for the image and the alt text data for the image; providing each of the prompts as inputs to a semantic comparison model, the semantic comparison model being trained to output similarity scores for the prompts, each of the similarity scores being indicative of a similarity between the natural language description and the alt text data for an image element associated with a prompt; and determining which image elements in the plurality of image elements require new alt text data based on the similarity score.

In yet another general aspect, the instant disclosure presents a method for validating alt text for images in web pages. The method includes extracting image data from the web pages, the image data including source data and alt text data for a plurality of image elements in the web pages; providing images defined by the source data as input to a computer vision component; receiving a natural language description of each of the images from the computer vision component; generating prompts for the image elements, each of the prompts being associated with an image and including at least the natural language description for the image and the alt text data for the image; providing each of the prompts as inputs to a semantic comparison model, the semantic comparison model being trained to output similarity scores for the prompts, each of the similarity scores being indicative of a similarity between the natural language description and the alt text data for an image element associated with a prompt; and determining which image elements in the plurality of image elements require new alt text data based on the similarity score.

In a further general aspect, the instant application describes a non-transitory computer readable medium on which are stored instructions that when executed cause a programmable device to perform functions of extracting image data from the web pages, the image data including source data and alt text data for a plurality of image elements in the web pages; providing images defined by the source data as input to a computer vision component; receiving a natural language description of each of the images from the computer vision component; generating prompts for the image elements, each of the prompts being associated with an image and including at least the natural language description for the image and the alt text data for the image; providing each of the prompts as inputs to a semantic comparison model, the semantic comparison model being trained to output similarity scores for the prompts, each of the similarity scores being indicative of a similarity between the natural language description and the alt text data for an image element associated with a prompt; and determining which image elements in the plurality of image elements require new alt text data based on the similarity score.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 4 is a flowchart of an example method of validating the accuracy of image alt text for image elements of web pages using an alt text validation system, such as the systems of FIGS. 2 and 3.

DETAILED DESCRIPTION

Figure 1:
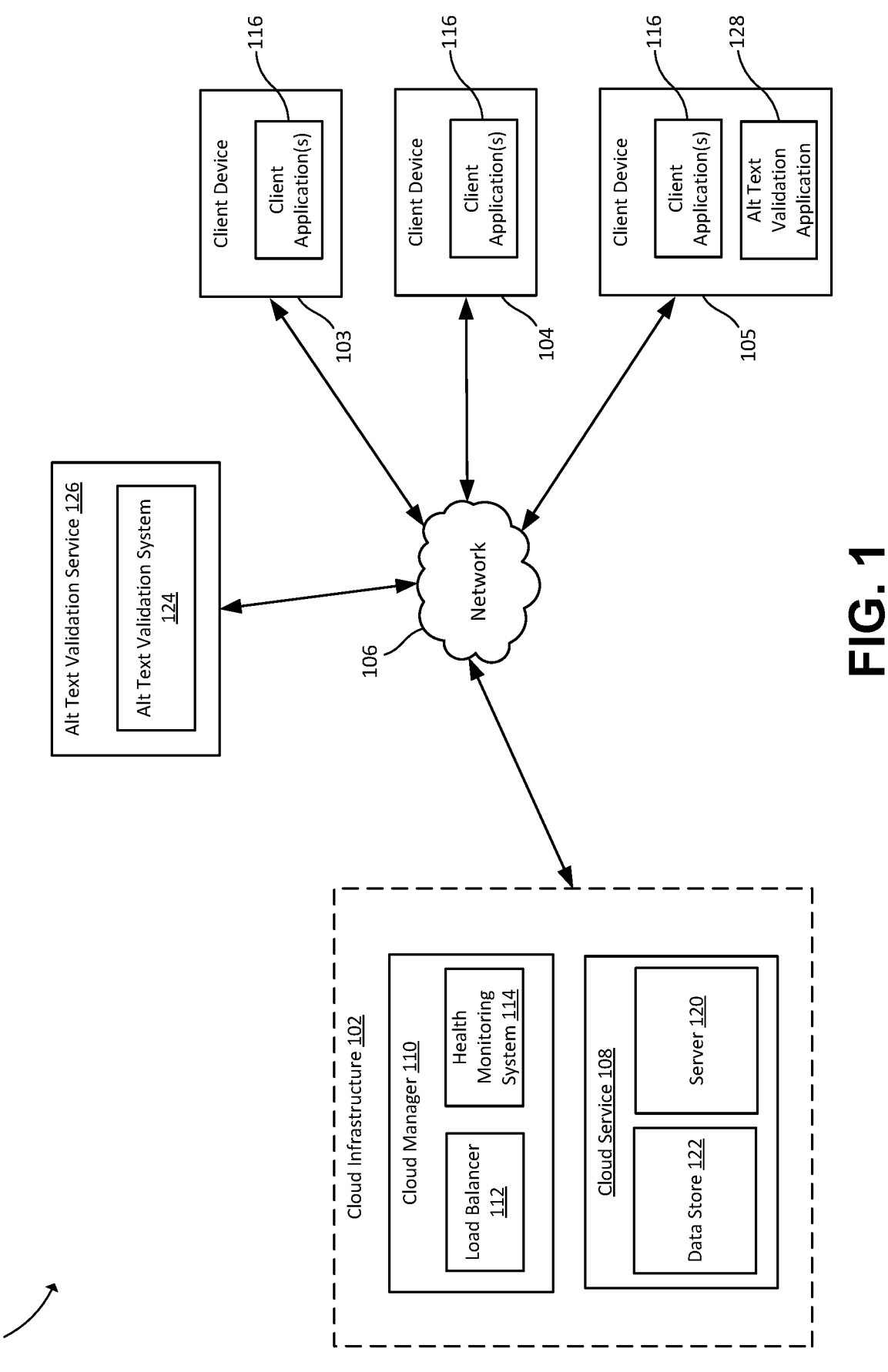
FIG. 1 is a diagram showing an example computing environment in which the techniques disclosed herein may be implemented.

Alt text plays a crucial role in making web content accessible, enhancing user experience, and improving search engine optimization (SEO). For example, alt text provides a textual description of images, making web content more accessible to people with visual impairments who use screen readers or other assistive technologies. It allows them to understand and interpret the content that images convey. Even for users without disabilities, alt text can enhance the overall user experience. When images fail to load due to slow internet connections or other issues, the alt text can provide context and information about the missing image. Alt text is also important in search engine optimization (SEO). Search engines use alt text to understand the content of images on web pages so search engines can index and rank content more accurately.

Because of the importance of alt text in improving accessibility, user experience, and SEO, it is crucial not only that (relevant) images have alt text, but also that the alt text for an image accurately describes the content and purpose of the image. Unfortunately, the alt attribute for images is often left empty or includes text which insufficiently and/or inaccurately describes the image. Alt text auditing processes are often performed to ensure that (i) images have alt text and (ii) that alt text is accurate. Alt text auditing has typically required one or more users to go through the HTML code for web pages to find each image, determine whether there is alt text for the image, evaluate the alt text for accuracy, and edit the alt text if necessary, which is a time-consuming and mentally taxing process. Another approach that is commonly used to check alt text is having a screen reader read the alt text and having testers decide whether what they see on the screen matches what is heard from the screen reader. In any case, manually checking alt text on an image-by-image basis is extremely time consuming.

Various automated tools have been developed recently to aid users in checking, or auditing, the alt text of web pages. While helpful, these tools are typically limited to identifying images that do not have alt text, retrieving alt text, and/or facilitating the editing of alt text. Even with these tools, evaluating and validating the accuracy of alt text is still performed manually by a user. Such evaluations therefore can be subjective and inconsistent as well as time-consuming.

To address these technical problems and more, in an example, this description provides technical solutions in the form of an alt text validation system that combines a web scrapper, a computer vision module, and a semantic comparison model to automatically validate the accuracy of alt text. The solutions work by first identifying the image elements in a webpage using the web scraper and retrieving the src and alt attribute values associated with each of the image elements. Using the src attribute of an identified image element, the image is sent to the computer vision module which analyzes the image and generates a natural language description of the image.

The system generates a prompt that instructs the semantic comparison model to perform a semantic comparison of the natural language description generated by the computer vision module and the alt text from the alt attribute of the image element. The semantic comparison model is fine-tuned to perform semantic comparisons of natural language descriptions and to output a result of the comparison which includes an assessment of the accuracy of the alt text. Depending on the assessed accuracy, the system may also be configured to generate an alt text suggestion for the image element, for example, if the accuracy of the current alt text is below a threshold accuracy level.

The technical solutions described herein address the technical problem of inefficiencies and difficulties associated with evaluation and validation of alt text. The technical solutions provide automated means of validating the accuracy of alt text and generating improved alt text if needed which is faster, less subjective, and more consistent than previously known systems and methods. By facilitating the identification of inaccurate alt text for images, the technical solutions described herein result in improved accessibility, user experience, and SEO optimization for the World Wide Web. The solutions also offer various technical improvements. For example, reducing the need for time-consuming, manual corrections of alt text data conserves computing resources as well as communication network bandwidth. In addition, the solutions improve data integrity of content with images which in turn increases the efficiency of developing and maintaining content on the web.

FIG. 1 is a diagram showing an example computing environment 100 in which aspects of the disclosure may be implemented. Computing environment 100 includes cloud infrastructure 102, client devices 104, 105 and a network 106. The network 106 includes one or more wired and/or wireless networks. In various implementations, the network 106 includes one or more local area networks (LAN), wide area networks (WAN) (e.g., the Internet), public networks, private networks, virtual networks, mesh networks, peer-to-peer networks, and/or other interconnected data paths across which multiple devices may communicate.

The cloud infrastructure 102 is configured to provide one or more cloud computing services and/or distributed computing services, such as cloud service 108, to users over the network 106. Cloud infrastructure enables cloud service 108 to host web pages and web applications as well as user authentication, file storage, and system update functionality. The cloud service 108 includes one or more servers 120 which are configured to provide hosting, computational, and storage resources for the cloud service 108. Servers are implemented using any suitable number and type of physical and/or virtual computing resources (e.g., standalone computing devices, blade servers, virtual machines, etc.). Cloud service 108 also includes one or more data stores 122 for storing data, programs, and the like for implementing and managing the cloud service 108. In FIG. 1, one server 120 and one data store 122 are shown although any suitable number of servers and/or data stores may be utilized.

Cloud infrastructure 102 includes a cloud manager 110 for managing various aspects of the cloud infrastructure, such as deploying, configuring, and managing physical and/or virtual machines. Cloud manager 110 includes a load balancer 112 for distributing requests and workloads among server farms and/or among servers of a server farm. The load balancer 112 utilizes parameters such as load, number of connections, and server performance, to determine where to distribute the requests and workloads. Cloud manager 110 also includes a health monitoring system 114 configured to monitor the health of physical and virtual resources. and identify faulty components so that remedial action can be taken.

Client devices 104, 105 enable users to access the services provided by the cloud service 108 via the network 106.

Client devices 104, 105 can be any suitable type of computing device, such as personal computers, desktop computers, laptop computers, smart phones, tablets, gaming consoles, smart televisions and the like. Client devices 104, 105 include one or more client (software) applications 116 that are configured to interact with the cloud service 108. In some implementations, client applications 116 include dedicated applications installed on the client device and programmed to interact with the cloud service 108. In other embodiments, client applications 116 include general purpose applications, such as a web browser, configured to access services over the network 106.

In accordance with the disclosure, cloud environment 102 includes an alt text validation system 124 that enables the accuracy of image alt text for images in web pages to be assessed. As shown in FIG. 1, the alt text validation system can be implemented as part of an alt text validation service 126 that is accessible over the network 106. In some implementations, some or all of the functionality of the alt text validation system is implemented by an alt text validation application 128 which can be installed and executed on a client device, such as client device 105.

To facilitate the validation of alt text, a computer vision component is used to generate a natural language description of image elements in web page. The accuracy of alt text is then assessed using a semantic comparison model which has been trained to measure a similarity between the natural language text generated for an image element and the alt text for the image element. The measured similarity can be compared to predetermined thresholds to determine whether alt text for an image element is an accurate or an inaccurate description of the image element. Inaccurate alt text may be flagged for further action from a user. In some implementations, the alt text validation system 124 is configured to generate new alt text that provides an accurate description of the associated image element. New alt text for an image element can be presented to a user via a user interface of the system as a suggestion for modifying or replacing the inaccurate alt text for the image element.

Figure 2:
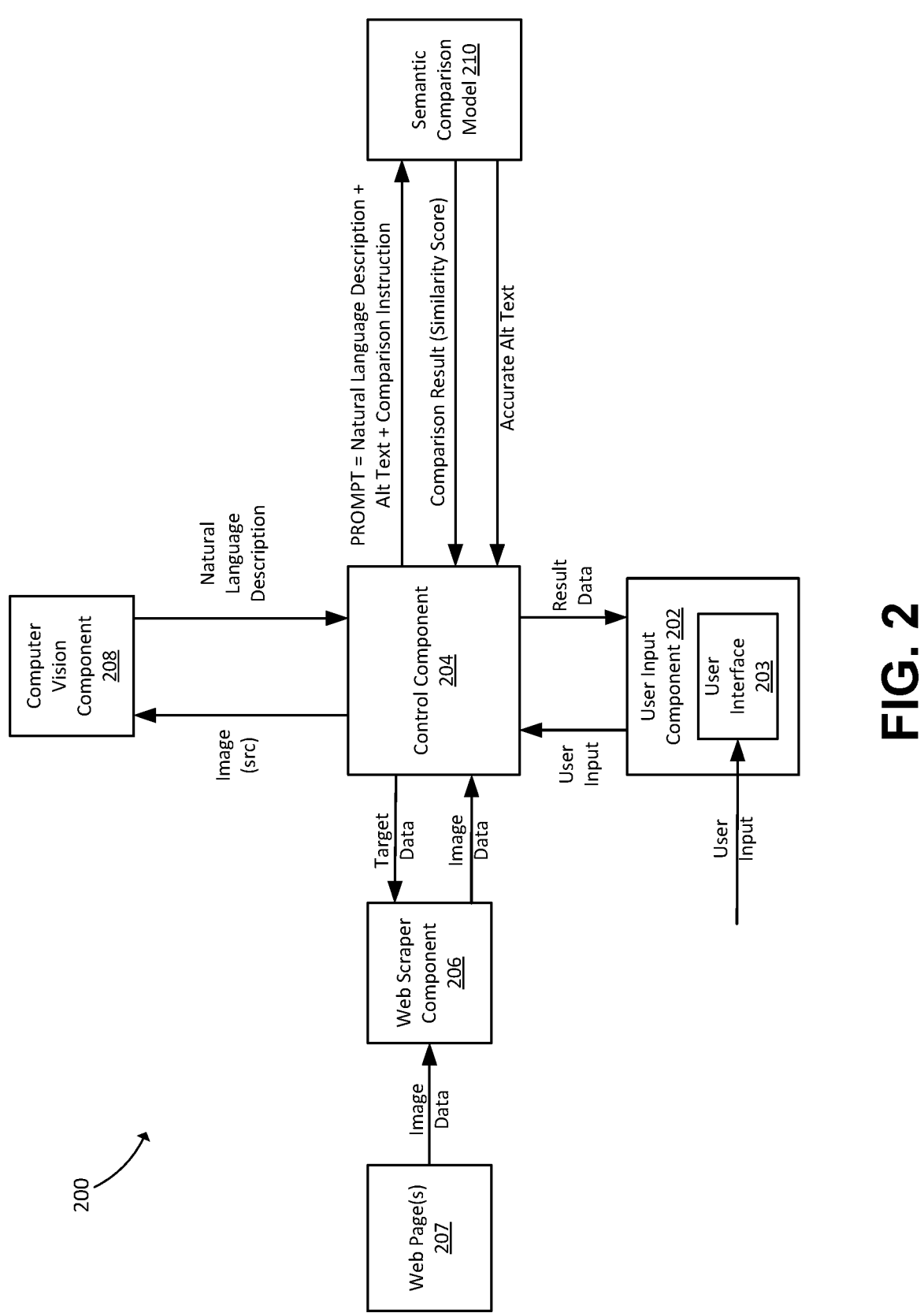
FIG. 2 is a schematic illustration of an example alt text validation system that may be implemented in the computing environment of FIG. 1.

FIG. 2 shows an example implementation of an alt text validation system 200. The alt text validation system 200 includes a user input component 202, a control component 204, a web scraper component 206, a computer vision component 208, and a semantic comparison model 210. The input component 202 is configured to receive user input that defines one or more parameters for the system 200. In various implementations, the one or more parameters specified by the user input can include an audit request indicating that performance of an alt text audit is being requested. The user input can include target data which designates one or more web pages (e.g., uniform resource locator (URL) addresses, domains, and the like) that are to be audited by the system. Depending on the implementation, the user input can also indicate various other parameters for the system, such as threshold values for similarity assessments, whether new alt text is to be generated, similarity threshold value(s) for new alt text generation, and the like. The input component 202 may include a user interface 203 that is displayed on a display of a computing device, such as a client device, and that enables a user to provide the user input, e.g., using a user input device, such as a mouse, keyboard, touch screen, and the like.

The control component 204 receives the user input and manages the performance of an alt text audit process based on the user input by controlling and coordinating the actions of the web scraper component 206, the computer vision component 208, and the semantic comparison model 210. In particular, in response to receiving the user input, the control component 204 provides the target data to the web scraper component 206 which retrieves image data (including src and alt attribute values) for the image elements in the one or more web pages 207 indicated by the target data.

The web scraper component 206 is a software tool or program designed to extract data from websites. The web scraper component 206 is programmed to navigate websites, locate specific HTML elements, and extract data from them. In this case, the web scraper component 206 is configured to navigate to the one or more web pages indicated by the target data, to locate all of the image elements (i.e., img elements) in the one or more web pages, and to extract the image data, i.e., the src attribute values and alt attribute values for each of the img elements from the web pages. Once data is extracted, the web scraper component 206 returns the extracted image data to the control component 204. In various implementations, the web scraper component 206 may be configured to preprocess the image data, e.g., by converting it into structured formats like CSV or JSON and storing it in a suitable data structure or file structure. The web scraper component 206 can be built using various programming languages, including Python, JavaScript, Ruby, and others, as well as pre-built scraping libraries and frameworks.

The control component 204 receives the image data, including the src attribute and alt attribute values for the image elements in the targeted web pages, from the web scraper component 206. The control component 204 is then configured to coordinate the generation of natural language descriptions for each of the image elements with the computer vision component 208. In particular, for each of the image elements, the control component 204 is configured to provide an image associated with the image element, as indicated by the src attribute of the image element, to the computer vision component 208.

The computer vision component 208 includes one or more machine learning models trained to perform an image captioning process on an input image. Image captioning is a computer vision and natural language processing (NLP) task that involves generating textual descriptions (captions) for images. In some implementations, the image captioning process is performed using an encoder-decoder framework, where an input image is encoded into an intermediate representation of the information in the image, and then decoded into a descriptive text sequence which is a natural language description of the input image. Any suitable machine learning model, algorithm, and/or technique can be used to generate the natural language descriptions for the input images. The computer vision component 208 outputs the natural language descriptions for the image elements (or the images associated with the image elements) to the control component 204.

Once the control component 204 has received the natural language description for an image element, the control component generates a prompt for the semantic comparison model 210 that provides the natural language text for the image element and the alt text (i.e., value of alt attribute) for the image element as input text for the model 210. The prompt is generated in a suitable format that can be understood by the semantic comparison model. In some implementations, the prompt includes an instruction which identifies the text processing operation to be performed on the input text. For example, models may be capable of performing multiple text generation tasks in which case the prompt includes text identifying the task to be performed, e.g., "Perform semantic comparison . . . ". In implementations that utilize a model dedicated to performing semantic comparison of two or more input texts, the prompt may not need to include the instruction text in the prompt.

A semantic comparison model is a type of artificial intelligence (AI) or natural language processing (NLP) model designed to compare and measure the similarity or relatedness between two input texts, such as words, sentences, paragraphs, or documents, based on their semantic meaning. In this case, the input texts correspond to the natural language description of an image element and the alt text for the image element, and the model 210 is trained to process the input texts to generate a similarity score according to a predefined similarity metric. The similarity score is indicative of a degree or level of similarity between the two input texts. The semantic comparison model 210 uses mathematical techniques and numerical representations that capture semantic information pertaining to the input texts and enable the similarity of the input texts to be calculated. In various implementations, the semantic comparison model 210 is implemented using a generative transformer-based model. In other implementations, the semantic comparison model can be implemented using any suitable type of machine learning model, algorithm, and/or framework which enables a semantic similarity between to texts to be determined.

A generative transformer-based model is a machine learning model trained to generate text using a transformer architecture. The transformer architecture uses encoder-decoder configuration, an encoder only configuration, or decoder only configuration to transform input text to input embeddings which can encode useful information pertaining to the input text. Once the embeddings have been generated, further operations/calculations can be performed to generate a result for a text generating task requested by the prompt.

For semantic comparison, a sentence transformer model can be used to generate the input embeddings for the system. A sentence transformer model takes a sequence of text as input and converts the sequence of text to a sentence embedding which captures semantic meaning of the input text. The sentence embedding maps the input text to a predetermined embedding space which enables further operations/calculations to be performed on the embedding. Sentence embeddings for both the natural language description of an image element and the alt text for the image element are generated in this manner. Once the sentence embeddings have been generated, a similarity metric, such as cosine similarity or dot product similarity, is used to compute a similarity score. The similarity score is a numerical value indicative of the degree or level of similarity between the two input texts. In some implementations, the similarity score is a numerical value between 1 and 0, where 1 means the input texts essentially identical and 0 means there is essentially no similarity between the input texts. In some implementations, the semantic comparison model is trained to generate a natural language output for expressing the similarity score for the image element. For example, the semantic comparison model can be trained to correlate similarity score values to different words that are capable of describing and differentiating degrees or levels of similarity, such as "low," "medium", and "high." The comparison result can then be generated with natural language text which describes the similarity between the image description and the alt text for an image element in a manner that may be more readily understood by a user, such as "the alt text has a high level of similarity to the natural language description for the image element."

The comparison result indicating the similarity for the alt text of an image element is returned to the control component 204. In various implementations, the control component 204 is configured perform one or more postprocessing operations on the comparison result, such as formatting the comparison result for transmission via a network and/or for display in the user interface 203. In some implementations, the control component 204 is configured to flag image elements that have been identified as having inaccurate alt text as requiring further action by a user to correct the alt text. In various implementations, the system is configured to generate new alt text to provide as a suggestion for instances when the similarity score for an image element is below a predefined threshold. For example, when the similarity score for the alt text of an image element is below a predefined threshold, the system generates new alt text which can be presented to a user as a suggestion for modifying or replacing the inaccurate alt text.

Figure 3:
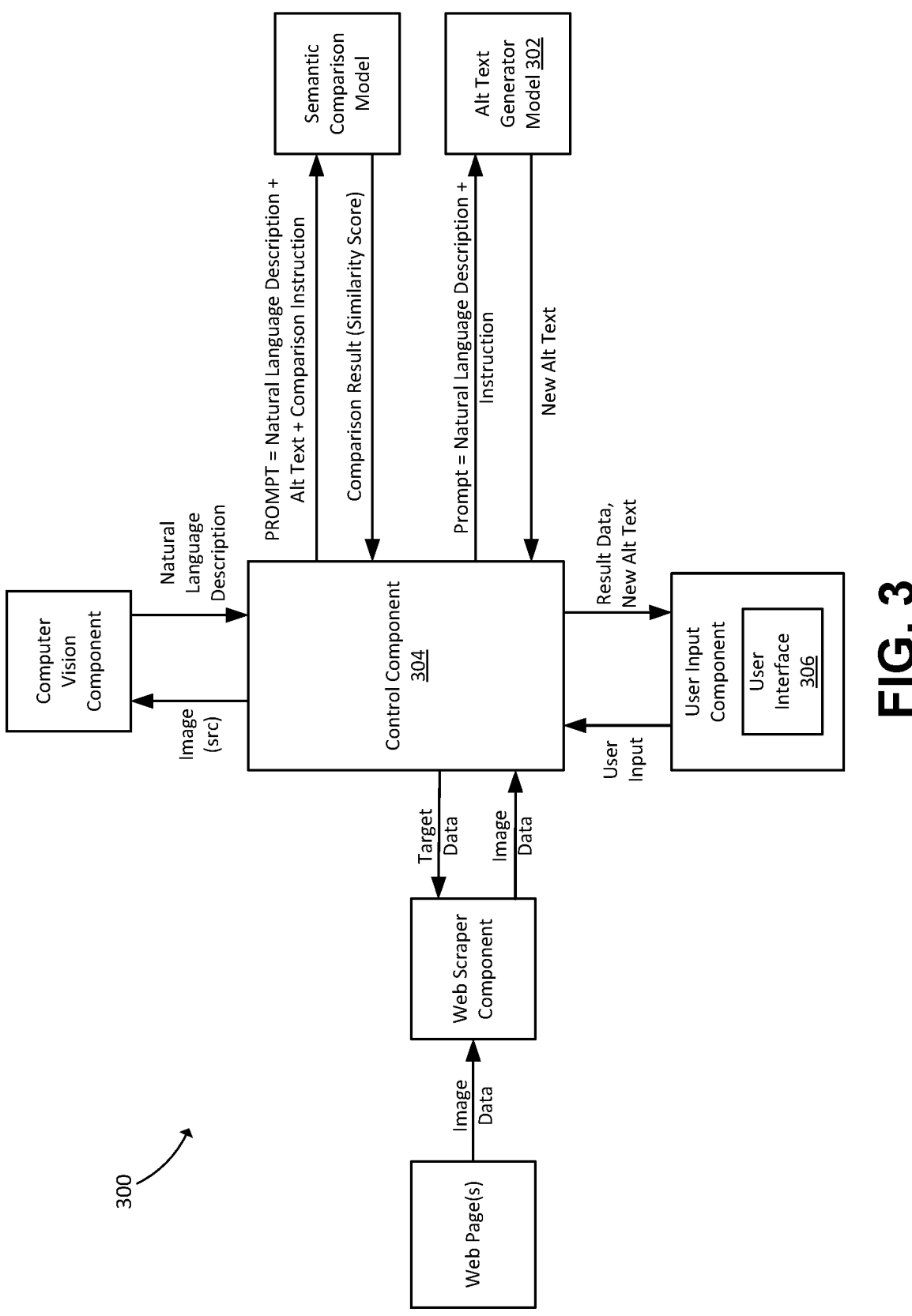
FIG. 3 is a schematic illustration of another example alt text validation system that may be implemented in the computing environment of FIG. 1.

In some implementations, the semantic comparison model is trained to generate new alt text for an image element when a similarity score is below a predefined accuracy threshold. In other implementations, new alt text can be generated using a separate generative language model, such as a Large Language Model (LLM) or a Generative Pre-trained Transformer (GPT) model, as shown in FIG. 3. The example implementation of the alt text validation system 300 FIG. 3 is substantially identical to the implementation of FIG. 2 except for the inclusion of an alt text generator model 302 which takes the natural language description of an image element as input and is trained to generate new alt text for the image element that has a requisite degree of similarity to the natural language description. In various implementations, the alt text generator model 302 is a generative transformer-based language model which is trained to convert a sequence of input tokens to a sequence of token embeddings and to generate new alt text token-by-token by iteratively predicting subsequent tokens (i.e., words) for the alt text until a complete alt text has been generated. Token prediction is autoregressive meaning that the predictions are performed with reference to the input token embeddings (i.e., the prompt) along with token embeddings of any previously generated tokens. In some implementations, a similarity score for the generated alt text can be maintained and used as a condition for guiding the token prediction process. Once new alt text has been generated, the new alt text is provided to the control component 304 which in turn provides the new alt text to the user interface 306 where it can be presented as a suggestion for modifying or replacing the inaccurate alt text of an image element.

FIG. 4 is a flowchart of an example method 400 for validating alt text for image elements in web pages using the alt text validation system described above. The method begins with receiving user input including target data which identifies one or more web pages for which the alt text is to be validated (block 402). The image data, including src attribute and alt attribute values of each of the image elements in the targeted web pages is then extracted using a web scraper component (block 404). Images associated with the image elements, as defined by the src attribute of the image elements, are then provided to a computer vision component which generates natural language descriptions for the image elements based on the images (block 406). A prompt is then generated for each image element that includes the natural language text for the image element and the alt text from the alt attribute of the image element (block 408). Each prompt is provided to the semantic comparison model which is trained to determine a value for a similarity metric (e.g., a similarity score) which is indicative of a similarity between the natural language description and the alt text data for an image element (block 410). The value of the similarity metric is then used to automatically identify image elements in the targeted web pages which have inaccurate alt text and perform additional action (block 412), such as flagging image elements with inaccurate alt text as requiring user action to correct the alt text (block 414) and/or generating new alt text for the image elements based on the natural language text generated for the image elements by the computer vision module (block 416).

Figure 5:
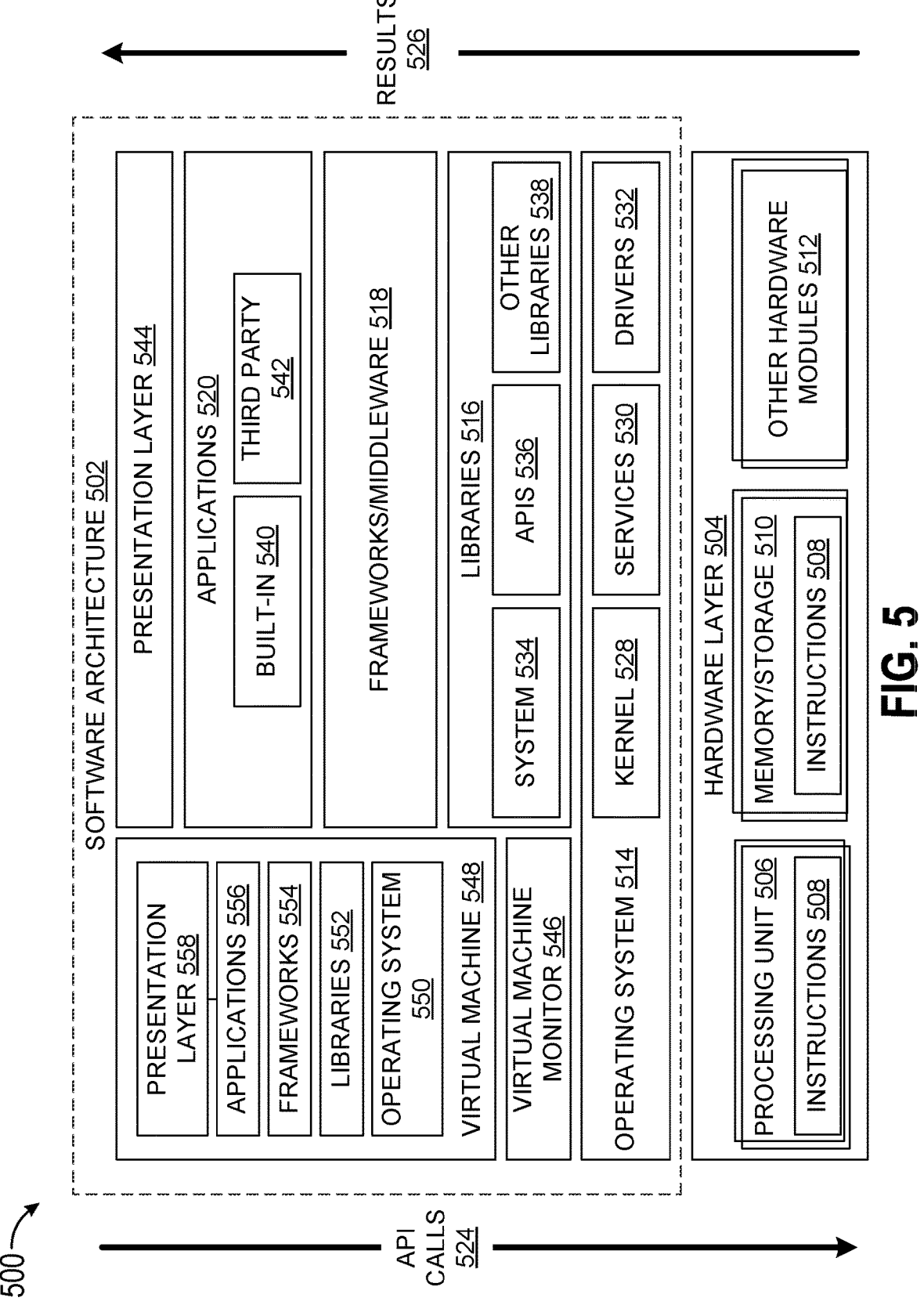
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture, and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine depicted in block diagram 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
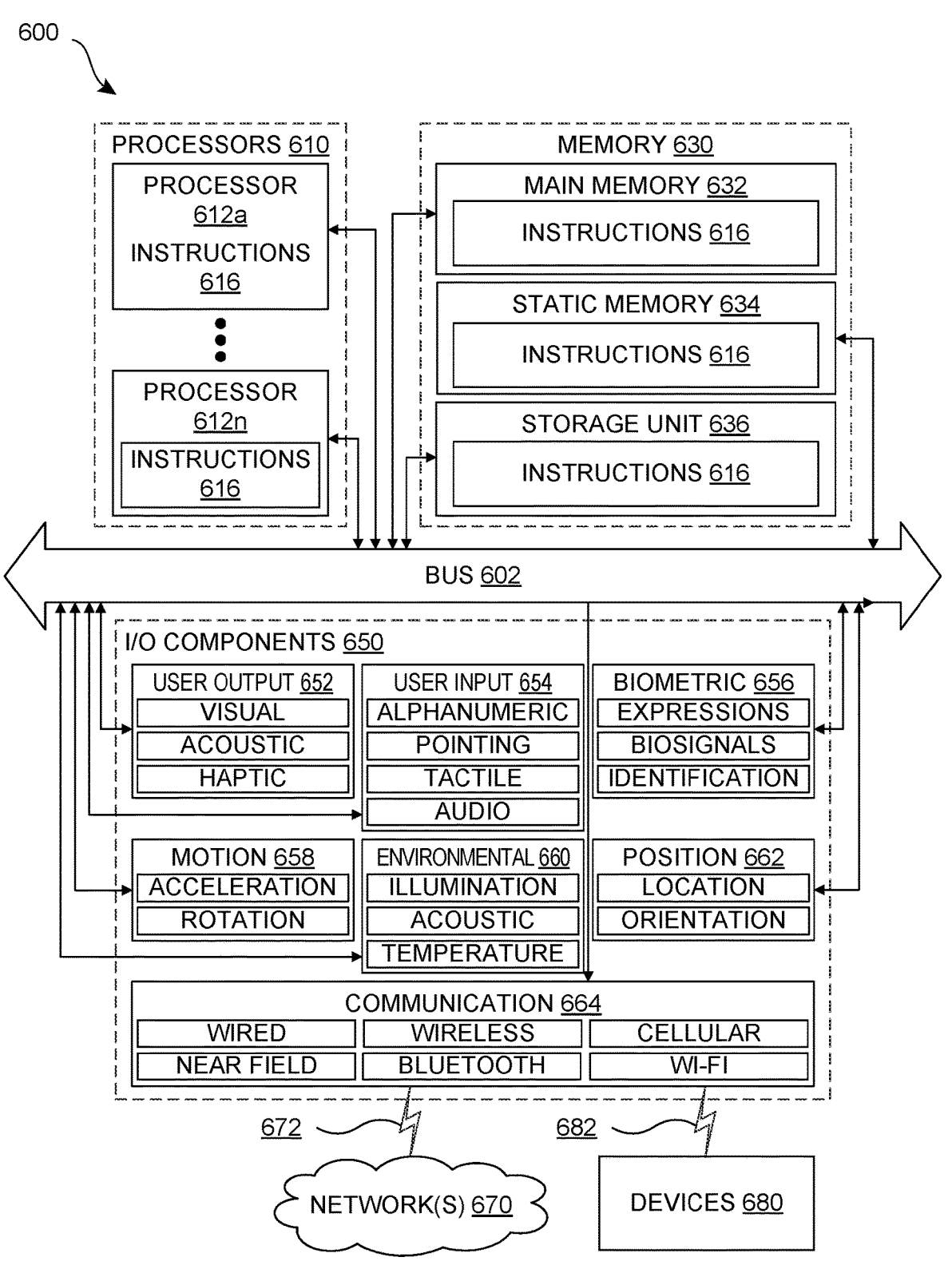
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peerto-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers). The motion components 658 may include, for example, motion sensors such as acceleration and rotation sensors. The environmental components 660 may include, for example, illumination sensors, acoustic sensors and/or temperature sensors.

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. An alt text validation system comprising:
a processor; and
a memory in communication with the processor, the memory comprising executable instructions that, when executed by the processor alone or in combination with other processors, cause the alt text validation system to perform an alt text audit process, the alt text audit process including:
extracting image data from at least one web page, the image data including source data and alt text data for a plurality of image elements in the at least one web page;
providing images defined by the source data as input to a computer vision component;
receiving a natural language description of each of the images from the computer vision component;
generating prompts for the image elements, each of the prompts being associated with an image and including at least the natural language description for the image and the alt text data for the image;
providing each of the prompts as inputs to a semantic comparison model, the semantic comparison model being trained to output similarity scores for the prompts, each of the similarity scores being indicative of a similarity between the natural language description and the alt text data for an image element associated with a prompt;
determining which image elements in the plurality of image elements require new alt text based on the similarity scores; and
flagging the image elements with inaccurate alt text as requiring user action to correct the alt text.

2. The alt text validation system of claim 1, wherein the alt text audit process further comprises:
comparing the similarity scores to one or more predefined threshold values for the similarity scores to determine which of the image elements require the new alt text;
generating the new alt text automatically using a generative language model; and
presenting the new alt text on a user interface of the alt text validation system.

3. The alt text validation system of claim 2, wherein generating the new alt text further comprises:
providing the natural language description generated for the images that require the new alt text as input to the generative language model.

4. The alt text validation system of claim 1, wherein the alt text audit process further includes:
receiving user input requesting the alt text audit process and identifying the at least one web page as a target of the alt text audit process.

5. The alt text validation system of claim 1, wherein each of the prompts includes an instruction for the semantic comparison model to perform a semantic comparison of the natural language description and the alt text data included in each of the prompts.

6. The alt text validation system of claim 1, wherein the semantic comparison model comprises a generative transformer-based model.

7. The alt text validation system of claim 6, wherein the generative transformer-based model comprises a sentence transformer model.

8. The alt text validation system of claim 1, wherein:
the image data is extracted from hypertext markup language (HTML) code for the at least one web page,
the source data is extracted from src attributes of the image elements, and
the alt text data is extracted from alt attributes of the image elements.

9. A method for validating alt text for images in web pages, the method comprising:
extracting image data from the web pages, the image data including source data and alt text data for a plurality of image elements in the web pages;
providing images defined by the source data as input to a computer vision component;
receiving a natural language description of each of the images from the computer vision component;
generating prompts for the images, each of the prompts being associated with an image and including at least the natural language description for the image and the alt text data for the image;
providing each of the prompts as inputs to a semantic comparison model, the semantic comparison model being trained to output similarity scores for the prompts, each of the similarity scores being indicative of a similarity between the natural language description and the alt text data for an image element associated with a prompt;
determining which of the images have inaccurate alt text based on the similarity scores; and
flagging image elements with the inaccurate alt text as requiring user action to correct the alt text.

10. The method of claim 9, further comprising:
comparing the similarity scores to one or more predefined threshold values for the similarity scores to determine which of the image elements require new alt text;
generating the new alt text automatically using a generative language model; and
presenting the new alt text on a user interface of an alt text validation system.

11. The method of claim 10, wherein generating the new alt text further comprises:
providing the natural language description generated for the images that require the new alt text as input to the generative language model.

12. The method of claim 9, further comprising:
receiving user input requesting an alt text audit process and identifying at least one web page as a target of the alt text audit process.

13. The method of claim 9, wherein each of the prompts includes an instruction for the semantic comparison model to perform a semantic comparison of the natural language description and the alt text data included in each of the prompts.

14. The method of claim 9, wherein the semantic comparison model comprises a generative transformer-based model.

15. The method of claim 14, wherein the generative transformer-based model comprises a sentence transformer model.

16. The method of claim 9, wherein:

the image data is extracted from hypertext markup language (HTML) code for at least one web page, the source data is extracted from src attributes of the image elements, and the alt text data is extracted from alt attributes of the image elements.

17. A non-transitory computer readable medium on which are stored instructions that, when executed, cause a programmable device to perform functions of:

extracting image data from the web pages, the image data including source data and alt text data for a plurality of images in the web pages;

providing the images defined by the source data as input to a computer vision component;

receiving a natural language description of each of the images from the computer vision component;

generating prompts for the images, each of the prompts being associated with an image and including at least the natural language description for the image and the alt text data for the image;

providing each of the prompts as inputs to a semantic comparison model, the semantic comparison model being trained to output similarity scores for the prompts, each of the similarity scores being indicative of a similarity between the natural language description and the alt text data for an image element associated with a prompt;

determining which of the images require new alt text based on the similarity scores; and flagging the images with inaccurate alt text as requiring user action to correct the alt text.

18. The non-transitory computer readable medium of claim 17, further comprise:

comparing the similarity scores to one or more predefined threshold values for the similarity scores to determine which of the images require the new alt text;

generating the new alt text automatically using a generative language model; and presenting the new alt text on a user interface.

19. The non-transitory computer readable medium of claim 17, wherein the semantic comparison model comprises a generative transformer-based model.

20. The non-transitory computer readable medium of claim 19, wherein the generative transformer-based model comprises a sentence transformer model.

* * * * *